US012431118B2

(12) United States Patent
Chang et al.

(10) Patent No.: US 12,431,118 B2
(45) Date of Patent: Sep. 30, 2025

(54) OPERATION METHOD OF SPEECH SYNTHESIS SYSTEM

(71) Applicant: INDUSTRY-UNIVERSITY COOPERATION FOUNDATION HANYANG UNIVERSITY, Seoul (KR)

(72) Inventors: Joon Hyuk Chang, Seoul (KR); Sung Woong Hwang, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 263 days.

(21) Appl. No.: 18/271,933

(22) PCT Filed: Dec. 2, 2021

(86) PCT No.: PCT/KR2021/095116
§ 371 (c)(1),
(2) Date: Aug. 9, 2023

(87) PCT Pub. No.: WO2022/154341
PCT Pub. Date: Jul. 21, 2022

(65) Prior Publication Data

US 2024/0153486 A1 May 9, 2024

(30) Foreign Application Priority Data

Jan. 13, 2021 (KR) ........................ 10-2021-0004856

(51) Int. Cl.
*G10L 13/08* (2013.01)
*G10L 13/02* (2013.01)
(Continued)

(52) U.S. Cl.
CPC .............. *G10L 13/08* (2013.01); *G10L 13/04* (2013.01); *G10L 13/07* (2013.01); *G10L 25/18* (2013.01)

(58) Field of Classification Search
CPC ......... G10L 13/08; G10L 13/04; G10L 13/07; G10L 25/18; G10L 13/02
(Continued)

(56) References Cited

U.S. PATENT DOCUMENTS

2018/0268807 A1* 9/2018 Agiomyrgiannakis ...................... G10L 13/047

FOREIGN PATENT DOCUMENTS

JP 2010-237323 A 10/2010
JP 2020-126141 A 8/2020
(Continued)

OTHER PUBLICATIONS

Sung-Woong Hwang et al., "Document-level Neural TTS using Curriculum Learning and Attention Masking", IEEE Access, 2016, pp. 1-10, vol. 4.
(Continued)

*Primary Examiner* — George C Monikang
(74) *Attorney, Agent, or Firm* — Sughrue Mion, PLLC

(57) ABSTRACT

The present disclosure provides an operating method of a speech synthesis system, which includes, inputting a first text and a first speech for the first text, and a second text and a second speech for the second text; generating a speech synthesis model trained by applying the first and second texts and the first and second speeches to curriculum learning; and outputting a target synthesis speech corresponding to a target text based on the speech synthesis model when inputting the target text for speech output, and the generating of the speech synthesis model includes generating a concatenation text in which the first and second texts are concat-
(Continued)

enated and a concatenation speech in which the first and second speeches are concatenated, and adding the concatenation text and the concatenation speech to the speech synthesis model when an error rate is smaller than a set reference rate when learning-concatenating the concatenation text and the concatenation speech.

8 Claims, 5 Drawing Sheets

(51) Int. Cl.

| | |
|---|---|
| ***G10L 13/04*** | (2013.01) |
| ***G10L 13/07*** | (2013.01) |
| ***G10L 25/18*** | (2013.01) |

(58) Field of Classification Search

USPC .................................................. 704/220, 231

See application file for complete search history.

(56) References Cited

FOREIGN PATENT DOCUMENTS

| | | | |
|---|---|---|---|
| KR | 10-2019-0085882 | A | 7/2019 |
| KR | 10-2033230 | B1 | 10/2019 |

OTHER PUBLICATIONS

Yahuan Cong et al., "PPSpeech: Phrase based Parallel End-to-End ITS System", arXiv: 2008.02490, Aug. 2020 [Retrieved on Apr. 12, 2022], Retrieved from <https://arxiv.org/abs/2008.02490>.
Seungtae Kang et al., "Improving Singing Voice Separation Using Curriculum Learning on Recurrent Neural Networks", Appl. Sci., 2020, pp. 1-15, vol. 10, No. 2465.
"SMART-Long_Sentence_TTS", Nov. 23, 2020, pp. 1-4.
Takatomo Kano et al., "Structured-based Curriculum Learning for End-to-end English-Japanese Speech Translation", arXiv:1802.06003v1 [cs.CL] Feb. 13, 2018, pp. 1-5.
International Search Report of PCT/KR2021/095116 dated Apr. 15, 2022 [PCT/ISA/210].

* cited by examiner

[FIG. 1]
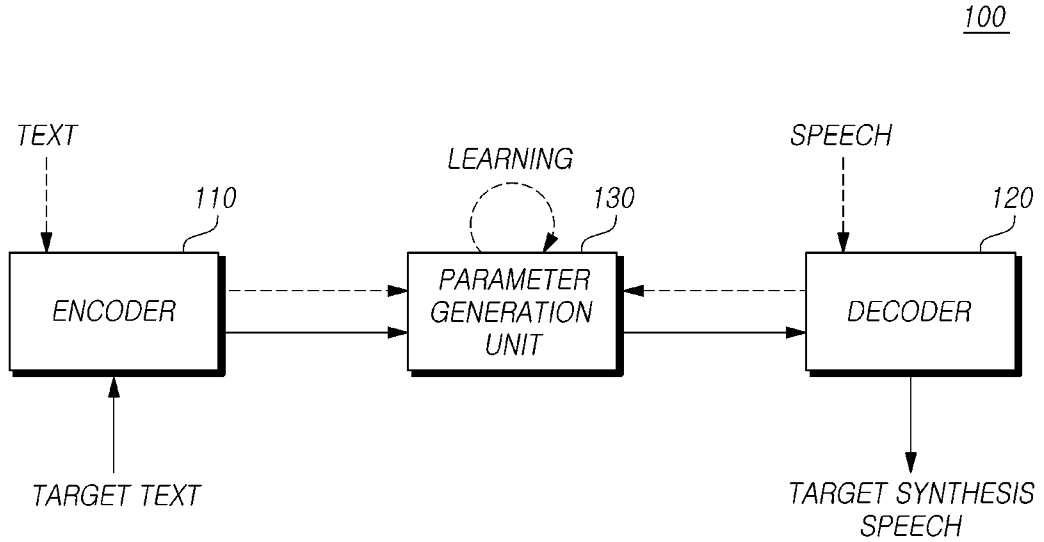

[FIG. 2]
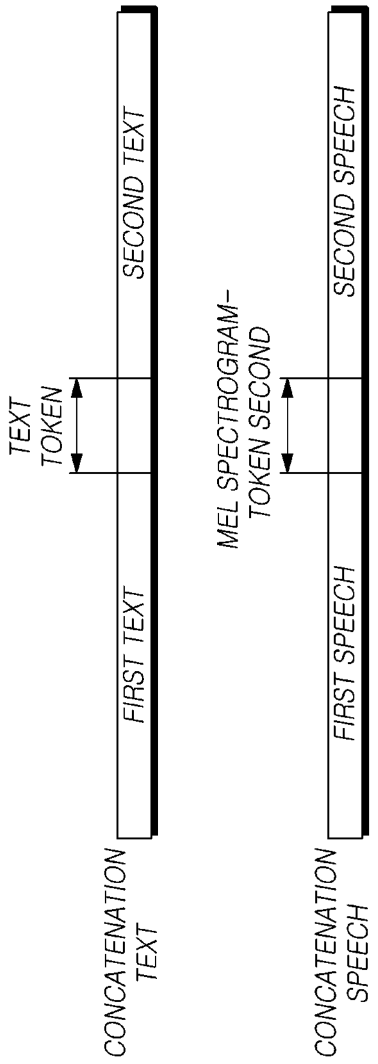

[FIG. 3]
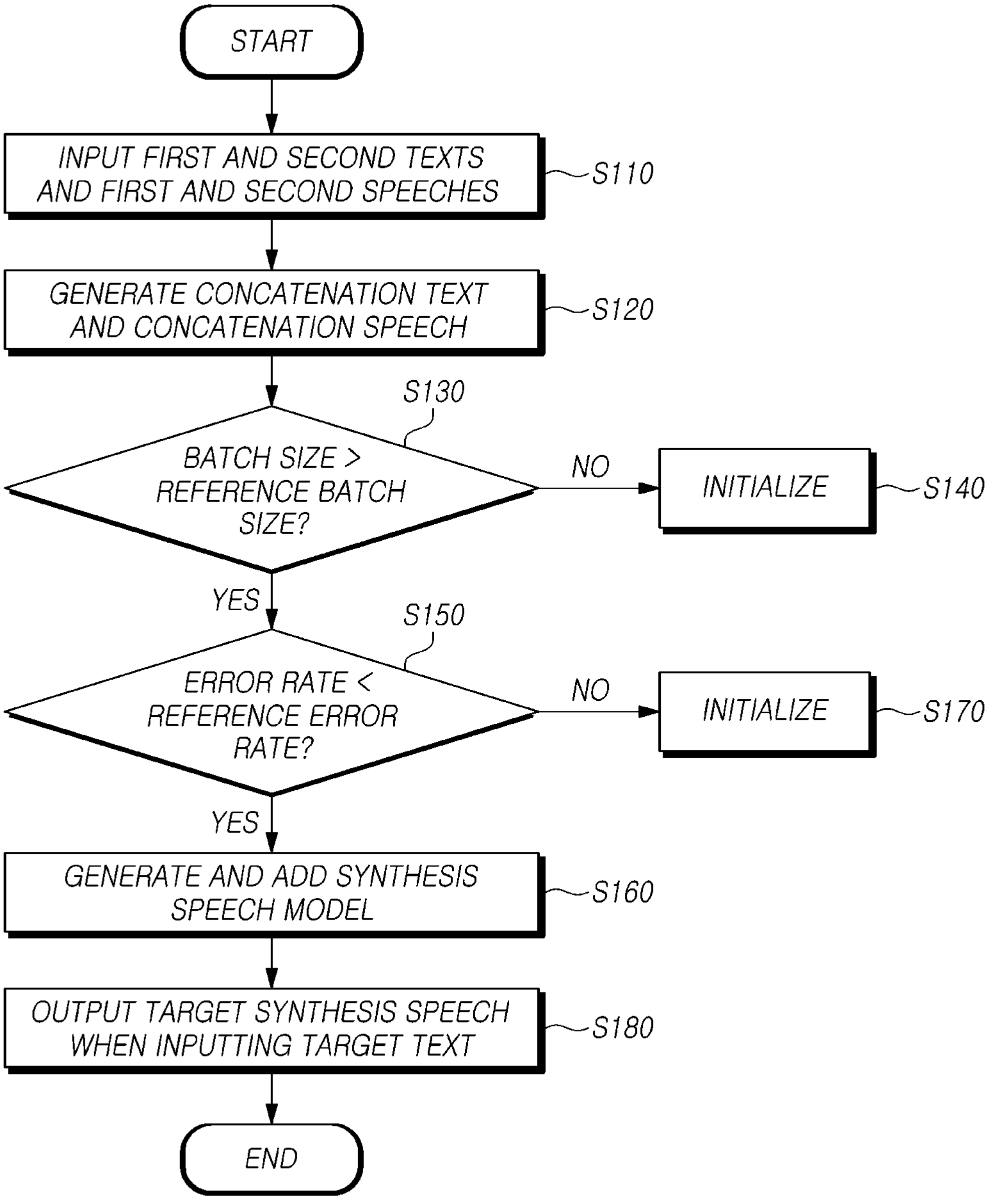

[FIG. 4]
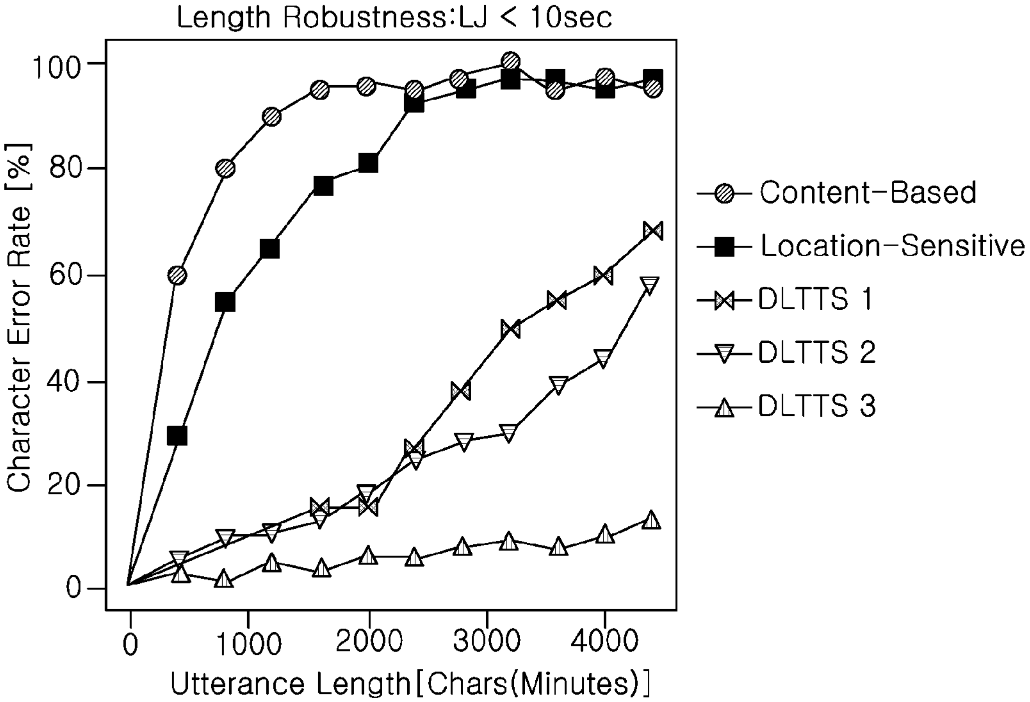

[FIG. 5]

| Method | Text length | Attention error rate |
|---|---|---|
| Content-Based | 10sec | 4/200 |
| | 30sec | 200/200 |
| | 1min | 200/200 |
| Location-Sensitive | 10sec | 0/200 |
| | 30sec | 24/200 |
| | 1min | 189/200 |
| Document-Level Neural TTS (curriculum learning with 1 sentence) | 10sec | 0/200 |
| | 1min | 1/200 |
| | 3min | 44/200 |
| | 5min | 101/200 |
| Document-Level Neural TTS (curriculum learning with 2 sentence) | 10sec | 0/200 |
| | 1min | 0/200 |
| | 3min | 8/200 |
| | 5min | 57/200 |
| Document-Level Neural TTS (curriculum learning with 3 sentence) | 10sec | 0/200 |
| | 1min | 0/200 |
| | 3min | 0/200 |
| | 5min | 2/200 |

OPERATION METHOD OF SPEECH SYNTHESIS SYSTEM

CROSS REFERENCE TO RELATED APPLICATIONS

This application is a National Stage of International Application No. PCT/KR2021/095116 filed Dec. 2, 2021, claiming priority based on Korean Patent Application No. 10-2021-0004856 filed Jan. 13, 2021.

TECHNICAL FIELD

The present disclosure relates to an operating method of a speech synthesis system, and more particularly, to an operating method of a speech synthesis system which may output a target synthesis speech corresponding to a long-sentence target text.

BACKGROUND ART

Artificial Intelligence (AI) is a technology that realizes human learning ability, reasoning ability, perception, and understanding of natural language as a computer program.

Currently developing artificial intelligence is concentrated on technologies required for implementing a conversational user interface (CUI). The technologies include speech to text (STT), natural language understanding (NLU), natural language generation (NLG), and text to speech (TTS).

The speech synthesis technology as a core technology for implementing the conversational user interface through the AI makes a sound such as human speaking through a computer or a machine.

The conventional speech synthesis is developed from a scheme (first generation) of creating a waveform by combining words, syllables, and phonemes, which are fixed length units and a variable synthesis unit connection method (second generation) using a text corpus to a third generation model. The third generation model applies a hidden Markov model (HMM) scheme primarily used for sound modeling for the speech recognition to the speech synthesis to implement high-quality speech synthesis using a database having an appropriate size.

For the conventional speech synthesis to train a timbre, an intonation, and a tone of a specific speaker, speech data of the speaker was required for at least 5 hours, and 10 hours or more to output a high-quality speech. However, much cost and time were required for securing speech data of the same person as much.

Further, when training of the model is completed and a speech is intended to be outputted, if a text having a larger length than that of the trained text is inputted, there is a problem in that an error occurs in synthesizing the speech according to the text.

In recent years, a method for synthesizing a speech without an error even when a text having a larger length than that of the trained text is inputted.

DISCLOSURE

Technical Problem

An object of the present disclosure is to provide an operating method of a speech synthesis system capable of outputting a target synthesis speech corresponding to a long-sentence target text.

The objects of the present disclosure are not limited to the above-mentioned objects, and other objects and advantages of the present disclosure that are not mentioned may be understood by the following description, and will be more clearly understood by embodiments of the present disclosure. Further, it will be readily appreciated that the objects and advantages of the present disclosure may be realized by means and combinations shown in the claims.

Technical Solution

An operating method of a speech synthesis system according to the present disclosure may include: inputting a first text and a first speech for the first text, and a second text and a second speech for the second text; generating a speech synthesis model trained by applying the first and second texts and the first and second speeches to curriculum learning; and outputting a target synthesis speech corresponding to a target text based on the speech synthesis model when inputting the target text for speech output, and the generating of the speech synthesis model may include generating a concatenation text in which the first and second texts are concatenated and a concatenation speech in which the first and second speeches are concatenated, and adding the concatenation text and the concatenation speech to the speech synthesis model when an error rate is smaller than a set reference rate when learning-concatenating the concatenation text and the concatenation speech.

The concatenation text may include the first and second texts, and a text token for distinguishing the first and second texts.

The concatenation speech may include the first and second speeches, and a mel spectrogram-token for distinguishing the first and second speeches.

The text token and the mel spectrogram-token may have a time interval of 1 to 2 seconds.

The text token and the mel spectrogram-token may be bundle intervals.

In the adding to the speech synthesis model, the texts and the speeches may be concatenated based on the text token and the mel spectrogram-token.

The operating method may further include, before the adding to the speech synthesis model, initializing the concatenation text and the concatenation speech when a batch size is smaller than a set reference batch size when learning-concatenating the concatenation text and the concatenation speech.

In the adding to the speech synthesis model, the concatenation text and the concatenation speech may be initialized when the error rate is larger than the reference rate.

Advantageous Effects

According to the present disclosure, an operating method of a speech synthesis system has an advantage in that a speech synthesis model from a short-sentence text to a long-sentence text is generate through learning by curriculum learning to facilitate speech synthesis for the long-sentence text.

Further, according to the present disclosure, the operating method of a speech synthesis system has an advantage in that a natural speech may be outputted upon speech synthesis for the long-sentence text.

Meanwhile, the effects of the present disclosure are not limited to the above-mentioned effects, and various effects may be included within the scope which is apparent to those skilled in the art from contents to be described below.

DESCRIPTION OF DRAWINGS

FIG. 1 is a control block diagram illustrating a control configuration of a speech synthesis system according to the present disclosure.

FIG. 2 is a schematic view for describing a concatenation text and a concatenation speech according to the present disclosure.

FIGS. 3 and 4 are a diagram and a table illustrating a test result for the speech synthesis system according to the present disclosure.

FIG. 5 is a flowchart of an operating method of a speech synthesis system according to the present disclosure.

MODE FOR INVENTION

The present disclosure may have various modifications and various exemplary embodiments and specific exemplary embodiments will be illustrated in the drawings and described in detail. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one component from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present disclosure will be described in detail with reference to the accompanying drawings.

FIG. 1 is a control block diagram illustrating a control configuration of a speech synthesis system according to the present disclosure and FIG. 2 is a schematic view for describing a concatenation text and a concatenation speech according to the present disclosure.

Referring to FIGS. 1 and 2, the speech synthesis system 100 may include an encoder 110, an attention 120, and a decoder 130.

The encoder 110 may process an inputted text, and the decoder 130 may output a speech.

Here, the encoder 110 may compress a text into a vector, and the decoder 130 may output the outputted speech. In this case, the speech may be a Mel spectrogram.

In this case, the encoder 110 may convert the text into a numeric vector expressing text information, and the present disclosure is not limited thereto.

The attention 120 may generate the speech from the text.

The attention 120 may minimize a slope loss phenomenon of an input sequence using an attention mechanism. The attention mechanism is expressed as the following function form.

$$\text{Attention}(Q,K,V)=\text{Attention Value}$$

Here, Q means a query, and is a value that reflects a hidden state in the decoder at the corresponding time point. K means a key and V means a value, which reflect hidden states of the encoder 110 at all time points. An attention function acquires a similarity of the query for the key, and then reflects the acquired similarity to the value to emphasize an important part.

Which portion of the encoder 110 should be concentrated to help a prediction value is expressed as a weight form when the decoder takes a Softmax after performing a dot product of a query which reflects a value of a current time point and a key which reflects an encoder value. In this case, each weight is referred to as an attention weight. Thereafter, in order to obtain a final result value of the attention, when a value which reflects a value of the encoder 110 and attention weight values are multiplied, an attention value is outputted. Since the attention value includes a context of the encoder 110, the attention value may be also called a context vector.

Finally, the context vector is concatenated with a hidden state of the current time point of the decoder 130 to acquire an output sequence.

The attention 130 synthesizes the text and the speech to generate the speech synthesis model.

That is, the attention 130 may generate a speech synthesis model learned by applying training data to set curriculum learning when the training data is inputted, and generate a target synthesis speech corresponding to a target text based on the speech synthesis model when the target text for speech output is inputted.

In the embodiment, it is described that the training data is constituted by a first text, a first speech for the first text, and a second text, and a second speech for the second text, but is not limited to the number of texts and the number of speeches.

When the first text and the first speech are inputted, the attention 130 may receive a vector for the first text from the encoder 110, and receive a Mel spectrogram for the first speech from the decoder 120.

In addition, when the second text and the second speech are inputted, the attention 130 may receive a vector for the second text from the encoder 110, and receive a Mel spectrogram for the second speech from the decoder 120.

In order to generate the speech synthesis model, the attention 130 may learn the first and second texts and the first and second speeches by applying the first and second texts and the first and second speeches to the set curriculum learning.

First, the attention 130 may individually learn and process the first and second texts and the first and second speeches.

Thereafter, the attention 130 may generate a concatenation text in which the first and second texts are concatenated and a concatenation speech in which the first and second speeches are concatenated.

Here, the concatenation text may include the first and second texts, and a text token for distinguishing the first and second texts, and the concatenation speech may include the first and second speeches, and a mel spectrogram-token for distinguishing the first and second speeches.

Here, the text token and the mel spectrogram-token are time intervals of 1 to 2 seconds, and may be bundle intervals.

The text token and the mel spectrogram-token are tools for naturally connecting two first and second texts to each other and recognizing two texts as one text.

In the embodiment, it is described that the attention 130 generates and learns one concatenation text and one concatenation speech with two first and second texts and two first and second speeches, but when there are a plurality of texts and a plurality of speeches, a plurality of concatenation texts and a plurality of concatenation speeches may also be generated, and the present disclosure is not limited thereto.

The attention 130 may initialize the concatenation text and the concatenation speech when a batch size is smaller than a set reference batch size when learning-concatenating the concatenation text and the concatenation speech.

When initializing the concatenation text and the concatenation speech, the attention 130 may re-concatenate the first and second texts and the first and second speeches, or not generate the concatenation text and the concatenation speech.

Thereafter, the attention 130 may add the concatenation text and the concatenation speech to the speech synthesis model when an error rate is smaller than a set reference rate when learning-concatenating the concatenation text and the concatenation speech.

In addition, the attention 130 may initialize the concatenation text and the concatenation speech when the error rate is larger than the reference rate.

The attention 130 may output the target synthesis speech corresponding to the target text based on the speech synthesis model when inputting the target text for the speech output.

In this case, when the vector for the target text is inputted from the encoder 110, the attention 130 may allow the target synthesis speech to be outputted to the decoder 120.

FIGS. 3 and 4 are a diagram and a table illustrating a test result for the speech synthesis system according to the present disclosure.

Referring to FIGS. 3 and 4, the speech synthesis system 100 uses Tacotron2 as a basic model, and additionally applies a model for curriculum learning to perform speech synthesis.

Here, as a batch size, 12 is basically used, and when n sentences are combined and learned in order to synthesize a long sentence through the curriculum learning within a limited GPU capacity, the batch size is set to be automatically reduced to a size of 1/n.

The speech synthesis system 100 has an advantage of being capable of synthesizing the long sentence at once.

In order to verify this, in the speech synthesis system 100, a speech synthesis test is conducted using a script of the novel Harry Potter, and an evaluation is conducted according to a length of the synthesized speech and the time.

In FIG. 3, in order to compare the length of the sentence which may be synthesized with the conventional model, a Tacotron model using a content based attention and a model proposed using the Tacotron2 model using a location sensitive attention are compared.

Further, in the proposed model, a performance comparison test of the model according to whether to apply the curriculum learning is conducted. For a length robustness test, a speech synthesized through Google Cloud Speech-To-Text is converted into a transcript, and the transcript is compared with an original to measure a character error rate (CER).

In FIG. 3, it may be confirmed that in the model proposed herein, the CER does not exceed the early 10% until a speech (approximately 4400 characters) having a length of 5 minutes and 30 seconds is synthesized, while the CER exceeds 20% during a 10-second section in the content based attention model and during a 30-second section in the location sensitive attention model.

It may be confirmed that only two sentences are linked when the curriculum learning is not applied (DLTTS1) and when the linked sentences are applied (DLTTS2), the CER rises up to a 60% section, but when the curriculum learning is applied by linking three sentences (DLTTS3), the CER falls to an early 10% section.

When document-level speeches are synthesized, if the attention 130 between the encoder 110 and the decoder 120 is not normally formed, an attention error such as word repeating or word skipping occurs in the synthesized speech.

Here, referring to FIG. 4, the model provided by the speech synthesis system 100 according to the present disclosure shows a much lower attention error rate at a document level than the conventional model.

Arbitrary 200 documents are tested for each length of the sentence to measure the number of times when the attention error occurs. According to a test result, the Tacotron model using the content based attention shows a high attention error rate when synthesizing sentences of 30 seconds or more, and the Tacotron2 model using the location sensitive attention shows a high attention error rate when the length of the synthesized sentence is equal to or more than 1 minute.

On the other hand, in the speech synthesis system 100 of the present disclosure, a document-level neural TTS model shows a comparatively low attention error rate even when synthesizing sentences of 5 minutes or more. This shows that the document-level sentence may also be stably synthesized. Further, it may be seen that when the curriculum learning is not used, the attention error rate exceeds 50% in a sentence environment of 5 minutes or more, while when the curriculum learning is executed with two sentences, an attention error rate of 25% is measured and when the curriculum learning is executed with three sentences, an attention error rate of approximately 1% is measured. Through this, we may see that the curriculum learning is a required element when performing document-level speech synthesis.

FIG. 5 is a flowchart of an operating method of a speech synthesis system according to the present disclosure.

Referring to FIG. 5, the speech synthesis system 100 may be inputted with a first text and a first speech for the first text, and a second text and a second speech for the second text (S110).

The speech synthesis system 100 may generate a concatenation text in which the first and second texts are concatenated and a concatenation speech in which the first and second speeches are concatenated by applying the first and second texts and the first and second speeches to a curriculum learning (S120).

The speech synthesis system 100 may judge whether a batch size is smaller than a set reference batch size when learning-concatenating the concatenation text and the concatenation speech (S130), and initialize the concatenation text and the concatenation speech when the batch size is smaller than the reference batch size (S140).

When the batch size is larger than the reference batch size, the speech synthesis system 100 may judge whether an error rate is smaller than a set reference rate when learning-concatenating the concatenation text and the concatenation speech (S150), and generate and add the concatenation text and the concatenation speech to the speech synthesis model when the error rate is smaller than the reference rate (S160).

After step S150, when the error rate is larger than the reference rate, the speech synthesis system 100 may initialize the concatenation text and the concatenation speech (S170).

After step S160, the speech synthesis system 100 may output a target synthesis speech corresponding to the target text based on the speech synthesis model when inputting the target text for the speech output (S180).

Features, structures, effects, and the like described in the above embodiments are included in at least one embodiment of the present disclosure, and are not particularly limited to only one embodiment. Furthermore, features, structures, effects, and the like exemplified in each embodiment may be combined or modified for other embodiments those skilled in the art to which the embodiments pertain. Therefore, the contents related to such combinations and modifications should be interpreted as being included in the scope of the present disclosure.

In addition, although the embodiments have been mainly described above, these are merely examples and do not limit the present disclosure, and those skilled in the art to which the present disclosure pertains will know that various modifications and applications not illustrated above may be made within the scope without departing from the essential characteristics of the embodiment. For example, each component specifically shown in the embodiment may be implemented by being modified. In addition, it will be interpreted that differences related to the modifications and applications are included in the scope of the present disclosure defined in the appended claims.

The invention claimed is:

1. An operating method of a speech synthesis system, comprising:

inputting a first text and a first speech for the first text, and a second text and a second speech for the second text;

generating a speech synthesis model trained by applying the first and second texts and the first and second speeches to curriculum learning; and outputting a target synthesis speech corresponding to a target text based on the speech synthesis model when inputting the target text for speech output, wherein the generating of the speech synthesis model includes generating a concatenation text in which the first and second texts are concatenated and a concatenation speech in which the first and second speeches are concatenated, and adding the concatenation text and the concatenation speech to the speech synthesis model when an error rate is smaller than a set reference rate when learning-concatenating the concatenation text and the concatenation speech.

2. The operating method of a speech synthesis system of claim 1, wherein the concatenation text includes the first and second texts, and a text token for distinguishing the first and second texts.

3. The operating method of a speech synthesis system of claim 2, wherein the concatenation speech includes the first and second speeches, and a mel spectrogram-token for distinguishing the first and second speeches.

4. The operating method of a speech synthesis system of claim 3, wherein the text token and the mel spectrogram-token have a time interval of 1 to 2 seconds.

5. The operating method of a speech synthesis system of claim 3, wherein the text token and the mel spectrogram-token are bundle intervals.

6. The operating method of a speech synthesis system of claim 3, wherein in the adding to the speech synthesis model, the texts and the speeches are concatenated based on the text token and the mel spectrogram-token.

7. The operating method of a speech synthesis system of claim 1, further comprising:

before the adding to the speech synthesis model, initializing the concatenation text and the concatenation speech when a batch size is smaller than a set reference batch size when learning-concatenating the concatenation text and the concatenation speech.

8. The operating method of a speech synthesis system of claim 1, wherein in the adding to the speech synthesis model, the concatenation text and the concatenation speech are initialized when the error rate is larger than the reference rate.

* * * * *